Patented Dec. 20, 1938

2,140,944

UNITED STATES PATENT OFFICE 2,140,944

AZO DYES

Erik Schirm, Dessau/Anhalt, Germany, assignor to General Aniline Works, Inc., New York, N. Y., a corporation of Delaware No Drawing. Application September 8, 1934, Serial No. 743,312. In Germany September 13, 1933

3 Claims. (Cl. 260—156)

The present invention relates to azo dyes and to methods of preparing the same.

It has been found that new valuable basic azo dyes are to be obtained, if aromatic amino compounds containing a quaternary ammonium group not substituting directly a hydrogen atom in meta-position to the amino group and containing a free position para to the amino group, which in this position are capable of being coupled with diazonium compounds, are employed as diazo and/or azo components. Of particular interest are the azo dyes of the general formula R→R'→R'', in connection with which as so-called "intermediate component" R', an aromatic amino compound of the kind indicated above is used, while the initial and final components can be any intermediate products capable of being diazotized or coupled, respectively. R can also represent a dyestuff, especially an azo dye with a diazotizable amino group, and the same can also contain as a component an intermediate product according to the present invention.

Of the basic azo dye components of the kind last described, commercially available and suitable for the method in question, the following may be mentioned by way of example: The (2-amino-4-methyl-phenyl)-trimethyl ammonium chloride, the β-(m-amino-phenoxy) ethyl-methyl piperidinium-methosulfate of the formula (I)

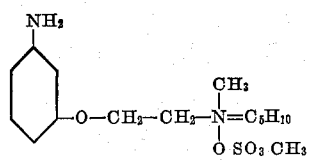

the β-(2-amino-4-methyl-phenoxy-) ethyl-methyl-piperidinium methosulfate of the formula (II)

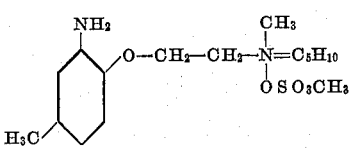

the 1-amino naphthalene, which in 2- 6-, 7- or 8 position is substituted by a quaternary ammonium radical, the (1-amino-2-methoxy-naphthyl-7-) trimethyl ammonium chloride of the formula (III)

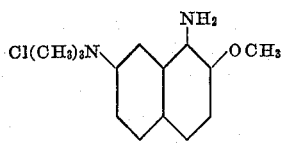

(which may be obtained from 2,7 amino naphthol by exhaustive methylation in an alkaline-methyl-alcoholic solution, nitration of the methoxy ammonium base thus obtained and reduction of the nitro group), the β-(1-amino-2-naphthoxy-) ethyl-methyl-piperidinium-methosulfate of the formula (IV)

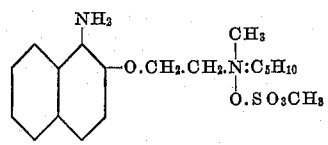

or the compound of the formula (V)

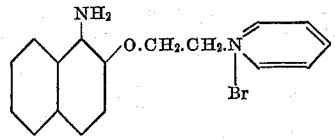

which may be obtained from 1-nitro-2-naphthol-β-bromoethyl-ether+pyridine and reduction of the nitro group, and other analogous compounds. In formulas such as II, IV and V, the ethylene group may be replaced by other alkylene groups, those having from 2 to 10 carbon atoms being suitable.

With the aid of the above mentioned intermediate products and their homologues and similar compounds, it is possible to extend the circle of the heretofore known basic azo dyes considerably and to enrich it by new shades. Moreover, a number of these dyestuffs are distinguished by a particularly strong affinity toward the cellulose fiber, which generally seems to be greater than that of the analogous acid azo dyes, which instead of the quaternary ammonium radical possess a sulfonic group. Thus it may be observed that many basic azo dyes of the kind in question even without the addition of salt in the boiling hot bath, are almost entirely absorbed out of the dye liquor by the cellulose fiber and that only a very small addition of salt is required in order to precipitate them completely upon the fiber. However, especially remarkable is their generally good and in many cases even quite striking, fastness to washing in the dyed goods without the disadvantage of difficult solubility of the original dyestuff. On the contrary, dyestuffs were found, which are easily soluble and which dye evenly but which, in the dyed goods are outstandingly fast to washing. Valuable further is the characteristic of these dyestuffs that those members of the group, the dyeings of which bleed in a hot soap bath do not, or only very little, dye cotton material which is being washed in the same bath, as is usually the case with the substantive dyestuffs derived from acid compounds.

According to the present invention, dyestuffs can also be further developed on the fiber by a method whereby, so far as they possess diazotizable amino groups, they are diazotized on the fiber and after treated with the customary developer, as, for instance, meta-phenylene-diamine, β-naphthol, phenylmethyl-pyrazolone and the like. In this connection it has been proven that when diazotizing in the usual manner, often the dyestuff bleeds considerably into the diazotizing bath as well as in the subsequent rinsing bath, which results in a noticeable weakening of the dyeing. One can overcome this disadvantage if the diazotizing and rinsing is not carried out in purely aqueous liquor, but in a liquor containing common salt or Glauber's salt in a suitable proportion.

If the dyestuff prepared according to the invention possesses still a place in the molecule capable of coupling, then its dyeing can be developed in the customary manner with diazonium compounds.

The known after-treatment with formaldehyde or with salts of lacquer-forming metals can be applied to the new dyestuffs without further ado, assuming that the constitution of the dyestuff is suitable; likewise it is possible to dye the new dyestuffs upon tannin-, antimony salt- or katanol mordant, as there is also no objection to the after-treatment of the dyeings with tanning principles (and thereafter perhaps with salts of lacquer-forming metals) or katanoles.

By means of these measures, a further considerable increase of the already good fastness to washing of the dyeings and also an increase of the fastness to light can be attained.

In cloth printing the new dyestuffs can be used exactly like other basic dyestuffs.

Finally several of the new dyestuffs have proven very suitable for the combined dyeing with dyestuffs derived from acid materials as outlined in French Patent Nr. 758,199 and U. S. application, Serial No. 679,890 filed July 11, 1933, Patent No. 2,123,154, issued July 2, 1938.

Example 1

A diazo solution prepared in the usual manner from 93 parts by weight of aniline is stirred into an ice-cooled solution of 360 parts β-(2-amino-4-methyl-phenoxy-) ethyl-methyl-piperidinium methosulfate (Formula II) in 6000 parts of water. Neutralize carefully with sodium bicarbonate or sodium carbonate solution until the liquid is weakly acid whereupon the coupling is finished in a short time. Acidify again with 216 parts of fuming 38% hydrochloric acid, diazotize with 69 parts of sodium nitrite and introduce the diazo solution into an ice-cold solution of 144 parts of β-naphthol and 120 parts of caustic soda in 2000 parts of water. Filter the precipitated dyestuff after some stirring, dissolve it in hot water with addition of some hydrochloric acid, to obtain acid reaction, filter the solution if necessary and separate the dyestuff by the addition of salt. Now filter the dyestuff off and dry it. The dyestuff dyes animal and vegetable fiber violet shades and may advantageously serve for the dyeing of mixed fabrics such as half wool and the like. Instead of the intermediate component used, also the more easily producible β-(2-amino-4-methyl-phenoxy-) ethyl pyridinium bromide of the following formula may be used.

(VI)

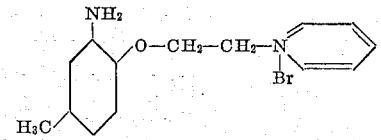

The methyl group in the above formula may be replaced by a methoxy or other alkoxy group.

Example 2

Three hundred and sixteen parts of amino benzyl-methyl-piperidinium-methosulfate (obtained by mononitration of benzyl chloride, reaction of the obtained mixture of o- and p-nitrobenzylchloride with piperidine, addition of dimethyl sulfate and reduction of the nitro group), dissolved in 5000 parts of water, are diazotized with 220 parts of fuming hydrochloric acid with 38% HCl and 69 parts of sodium nitrite. Introduce while stirring the diazo solution into a solution of 312 parts of trimethyl (8-amino naphthyl-2-) ammonium-methosulfate (obtained from 8-nitro-2-naphthyl-amine by exhaustive methylation with dimethyl sulfate and subsequent reduction of the nitro group) in 5000 parts of water, which is cooled down below 10° C. For the completion of the evenly proceeding coupling add soda solution until the Congo acid reaction of the solution has just disappeared, acidify again with 220 parts of 38% hydrochloric acid, diazotize with 69 parts of sodium nitrite, whereby quickly a color-change from blue red toward yellowish brown takes place, stir the diazo solution gradually into an ice-cold solution of 263 parts of 2.3-hydroxynaphthoic acid anilide and 200 parts of caustic soda in 7000 parts of water, whereby the phenol phthalein-alkaline reaction of the mixture even at the end is not supposed to disappear. After the completion of the coupling filter off the precipitated dyestuff, dissolve it in hot water while adding so much hydrochloric acid, that a sample separated by the addition of salt indicates weakly acid Congo acid reaction, filter off the insoluble portion if necessary, and salt out the filtrate. After cooling, filter off the purified dyestuff and dry it. It forms a dark violet resin which is brittle when cold and dyes the cellulose fiber violet shades. The dyeings are effectively fast to washing. Its constitution formula may be represented as follows:

(VII)

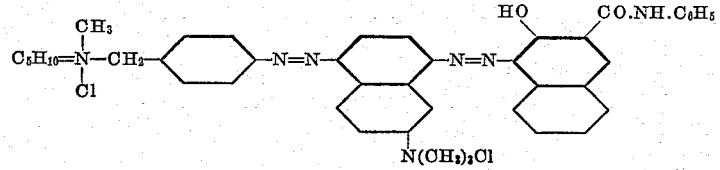

Example 3

305.7 parts of p'-aminobenzoyl-m-amino phenyl-trimethyl ammonium chloride (compare French Patent Nr. 768,263 and U. S. application, Serial No. 709,949, filed February 6, 1934) are dissolved in 2500 parts of water, compounded with 216 parts of 38% hydrochloric acid and diazotized with 69 parts of sodium nitrite at temperatures below 10° C. Introduce the diazo solution into an ice-cold solution of 312 parts of trimethyl - (8-aminonaphthyl - 2 - ) ammonium methosulfate (compare Example 2) in 5000 parts of water, whereby an even coupling takes place. Since the formed dyestuff, being red-violet in an acid solution, orange in an alkaline one, is not capable of being salted out, but is precipitable with potassium iodide, control the course of the coupling by tests of the reaction mixture being compounded with potassium iodide. For the completion of the conversion carefully add soda solution at the end until the solution is only weakly acid. Acidify again with 216 parts of 38% hydrochloric acid and diazotize with 65 grams of sodium nitrite. During the diazotization, which takes place fairly slowly, the color of the solution changes from red-violet toward yellowish-brown. After the diazotization is finished, add a cooled solution of 143 parts α-naphthylamine in 5000 parts of water and 100 parts of 38% hydrochloric acid and complete the coupling which starts immediately by addition of 500 parts of crystallized sodium acetate. After standing for a long time, (about 12 hours) the dyestuff solution is heated to 60° C. rendered alkaline by addition of soda and precipitated with salt. After cooling the precipitated dyestuff is filtered and dried at moderate heat in the vacuum. It is very strongly substantive and dyes cotton in a neutral or weakly acid bath blue tints which are very fast to washing. It can be diazotized with nitrite and hydrochloric acid on the fiber in a bath containing a strong solution of common salt and may be after-treated with the usual developers with the result that still better fast to washing and also fast to light dyeing is obtained.

If in the example the α-naphthyl-amine is substituted by the 8-hydroxyquinoline, a dyestuff is obtained, which, treated on the fiber with the salts of the lacquer-forming metals as of the iron, copper, chrome, nickel, cobalt, etc., yields dyeings outstandingly fast to washing and light in different shades.

Intermediate and final components of the dyestuff can also be exchanged. In this case it is necessary however, to conduct the diazotization of the mono-dyestuff obtained as intermediate product, in such a manner that the same is dissolved in hot water and that the hot solution is introduced in a mixture of nitrite, hydrochloric acid and ice. The difficultly soluble brown diazonium compound, thus obtained, is suitably filtered before the subsequent treatment and then stirred into a paste with ice water.

*Example 4*

Proceed exactly as in Example 3, only at the second coupling substitute the α-naphthylamine by 108 parts of m-phenylenediamine, which is applied in a free form, dissolved in water. The dyestuff thus obtained dyes cotton gray blue shades, fast to washing and can also, as described in Example 3, be diazotized and developed on the fiber. Its dyeing can also be after-treated with diazotized p-nitroaniline, whereby a very fast to washing gray or black can be obtained.

*Example 5*

One hundred and eighty-four parts of benzidine are tetrazotized in the usual way, and the clear tetrazo solution is stirred into an ice-cold solution of 624 parts trimethyl-(5-aminonaphthyl-2-) ammonium methosulfate obtained from 5-nitro-2-naphthylamine similar to Example 2 in 10,000 parts of water, whereby a black viscous precipitation is formed at once and finally solidifies the mixture to a jelly. Now add 800 parts of crystallized sodium acetate in concentrated aqueous solution, whereupon the mixture becomes thinner and acquires an orange color. After it has been standing for a prolonged time, heat it until everything is clearly in solution, and add so much common salt that the dyestuff is fully precipitated in the heat. In order to bring the same into a filterable form, cool and suck or press the dyestuff, then dry.

The dyestuff dyes wool and cotton in the shade of Congo red very fast to washing; it is not fast to acid, but with acids it changes toward blue, yet is is considerably less acid-sensitive than the analogous dyestuff from tetrazotized benzidine and Cleves' acid, and dyed on the latter or used as a base for it (compare application, Serial No. 679,890 above mentioned), it yields a more yellowish red very fast to washing and likewise not too acid sensitive.

Faster dyeings are obtained by diazotizing the dyed material in a solution of common salt and by after-treatment with the customary developers. Thus, for instance, m-phenylenediamine yields a blue black, β-naphthol a violet brown, 1-phenyl-3-methyl-5-pyrazolone a red brown.

*Example 6*

Three hundred and forty-five parts of β-(1'-amino-2'-naphthoxy-) ethyl-pyridinium bromide (formula V) are dissolved in 10,000 parts of water and diazotized with 69 parts of sodium nitrite and 580 parts of 38% hydrochloric acid under cooling with ice. Then add to the diazonium solution a cold solution of 143 parts α-naphthyl amine in 5000 parts of water and 100 parts of 38% hydrochloric acid and thereafter add carefully so much soda solution or sodium acetate that the development is completed. The monoazo dye is salted out while warm and filtered. Then dissolve it in the necessary quantity of hot water and introduce this solution, while stirring it energetically, into a mixture of 69 parts sodium nitrite, 216 parts of 38% hydrochloric acid and so much crushed ice, that at the end of the addition the temperature of the mixture does not raise above 10° C. If necessary, add further quantities of ice during the introduction. After a longer stirring, the precipitated diazonium compound is filtered and with ice water stirred into a paste. The latter is gradually, during stirring, added to a solution of 312 parts trimethyl-(8-amino naphthyl-2)-ammonium methosulfate (compare example 2) in 5000 parts of water, whereupon the coupling is completed by addition of sodium acetate. The dyestuff obtained is salted out while warm, filtered and dried. It dyes cotton blue shades which are very fast to washing and may be, when diazotized on the fiber, developed with beta-naphthol to a blue outstandingly fast to washing.

What I claim is:

1. The basic azo dyestuff of the following formula:

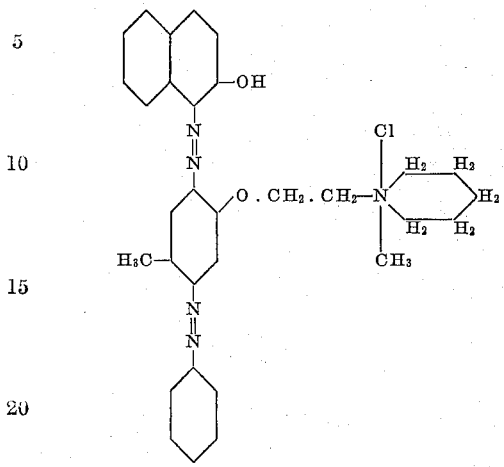

capable of dyeing animal and vegetable fiber violet red shades of very good fastness to washing.

2. The basic azo dyestuffs of the following general formula: R—N=N—R—N=N—R wherein the azo groups stand in para-position to each other and at least one R represents a member of the group consisting of radicals of the benzene and naphthalene series containing a quaternary ammonium radical selected from the group consisting of alkyl piperidinium and pyridinium joined to the aromatic nucleus through an ethylene-oxy group, the oxygen atom of which is connected to the said nucleus, the remaining R's standing for members of the group consisting of radicals of the benzene, naphthalene and diphenyl series, said dyestuffs having a high affinity for cellulose fiber and being capable of yielding dyeings of a very good fastness to washing.

3. The basic azo dyestuffs of the following general formula: R—N=N—R—N=N—R wherein the azo groups stand in para-position to each other and at least one R represents the radical of a quaternary ammonium substituted aromatic amino compound selected from the group consisting of beta-(1-amino-3-phenoxy)-ethyl methyl piperidinium chloride, beta-(2-amino-4-methyl-phenoxy)-ethyl methyl piperidinium chloride, beta-(2-amino-4-methyl-phenoxy)-ethyl pyridinium bromide, beta-(1-amino-2-naphthoxy)-ethyl methyl piperidinium chloride, beta-(1-amino-2-naphthoxy)-ethyl pyridinium bromide, the remaining R's standing for members of the group consisting of radicals of the benzene, naphthalene and diphenyl series, said dyestuffs having a high affinity for cellulose fiber and being capable of yielding dyeings of a very good fastness to washing.

ERIK SCHIRM.